Jan. 8, 1963     C. B. SJÖHOLM ETAL     3,071,860
APPARATUS FOR STRAINING CHEESE CURDS
Original Filed Sept. 22, 1955     4 Sheets-Sheet 1

INVENTORS
NILS ARNE HENTZEL
CLAES BERTIL SJOHOLM

BY Davis, Hoxie, Faithfull & Hapgood

ATTORNEYS

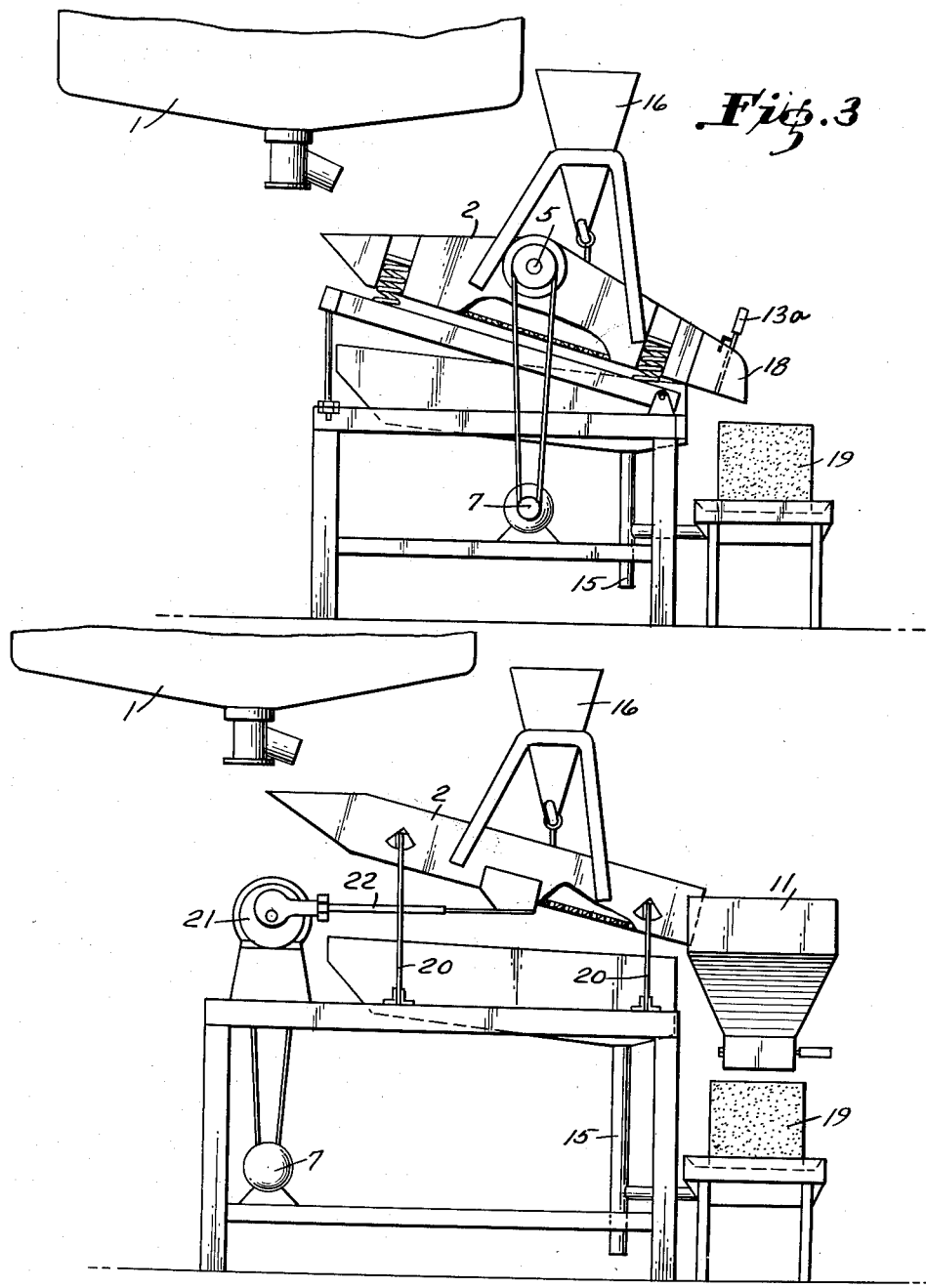

Jan. 8, 1963   C. B. SJÖHOLM ET AL   3,071,860
APPARATUS FOR STRAINING CHEESE CURDS
Original Filed Sept. 22, 1955   4 Sheets-Sheet 4

INVENTORS
Nils Arne Hentzel
Claes Bertil Sjöholm
BY
Davis, Hoxie,
Faithfull & Hapgood
ATTORNEYS United States Patent Office 3,071,860
Patented Jan. 8, 1963

3,071,860
APPARATUS FOR STRAINING CHEESE CURDS
Claes Bertil Sjöholm and Nils Arne Nilsson, now by change of name Nils Arne Hentzel, Malmo, Sweden, assignors to Aktiebolaget Separator, Stockholm, Sweden, a corporation of Sweden
Original application Sept. 22, 1955, Ser. No. 535,988, now Patent No. 2,942,343, dated June 28, 1960. Divided and this application Nov. 6, 1959, Ser. No. 851,348
7 Claims. (Cl. 31—46)

This invention relates to the straining of cheese curds and has particular reference to an improved apparatus for this purpose.

This application is a division of our copending application Serial No. 535,988, filed September 22, 1955, now Patent No. 2,942,343.

When preparing cheese curds in a cheese vat, the milk to be treated is successively subjected to a number of treatments until curds are ready to be introduced into the cheese molds outside the cheese vat, after the curds in the vat have been freed from whey. At the present time, however, it is desirable to use a continuous process in which the curds are discharged more or less continuously from the apparatus in which they are prepared. In this case, the treatment of the milk first takes place in a tank in which a mass consisting of so-called curd particles is gradually formed. This mass in the tank contains a large quantity of whey, and the first thing to be done is to separate the whey from the mass. For this purpose, a straining drum has been used, that is, a perforated drum rotating on an approximately horizontal axis. The curds suspended in the whey are fed into this drum at one end and the curds freed from whey are discharged from the opposite end, whereupon they are filled into the cheese molds. Another type of cheese curd strainer comprises a vertical, perforated drum in which a screw or worm rotates, the whey-containing curds being introduced at the bottom and the curds freed from whey being withdrawn at the top of the drum.

Both of these types of strainers have proved to have serious disadvantages. In making certain types of cheese, such as so-called Svecia cheese, salt should be added to the mass of curd particles after the whey has been strained off but before the curd mass is fed into the cheese mold. It has proved very delicate, if not impossible, to effect a reliable salt dosage when using the two types of strainers mentioned. Also, strainers of the type having a vertical screw or worm are subject to the further serious disadvantage that the curd particles are subjected to an excessively rough treatment.

The principal object of the present invention is to provide a curd straining apparatus which overcomes these disadvantages.

A curd straining apparatus made according to the invention comprises a shaking or vibrating strainer for separating off the whey. The curds are introduced on a vibrating or shaking trough with a perforated bottom, which slopes downward more or less toward one end so that the curd particles will be fed toward this end in a layer, the thickness of which depends among other things on the amount of liquid-containing curds supplied to the trough. Located over the trough near its outlet end and preferably secured to it is a salt container, the outlet of which extends straight across the trough throughout its width. This outlet of the salt container is automatically regulated by a device which is responsive to changes in the thickness of the layer of curds after the whey has been strained off. The vibration to which the trough is subjected is thus transmitted to the salt container so that the salt grains flow along in an even flow which distributes uniformly on the mass of curd particles. If necessary, the salt outlet may be provided with a rotating, grooved roller, or the like, which in a well known manner assures an even and uniform discharge.

According to the present invention, the inclined vibratory strainer is divided into at least two sections, the upper of which is operable to separate the major part of the whey from the curds; and means are provided, such as a spray tube located above the strainer, for introducing a washing liquid into the lower section for flushing the curds received from the upper section. As a further feature, the strainer has a third section to which the curds pass from the next upper or flushing section; and means are provided for introducing a cooling liquid into this third section for cooling the previously flushed curds. This third section may be followed by a fourth section of the strainer, to which a final cooling liquid is fed by suitable means. Preferably, a collecting trough is located below the strainer and has sections for receiving the whey, the flushing liquid and any cooling liquid, respectively, passing through the strainer, this trough having tubes for separately discharging the whey, the flushing liquid, and any such cooling liquid. To prolong the vibratory straining action on the curds while they still have a relatively high whey content, and thereby de-whey them more effectively, we prefer to provide the bottom of the strainer, at its upper portion, with an upwardly directed, transversely extending protuberance.

The accompanying drawings illustrate preferred embodiments of the invention, by way of example. In the drawings:

FIGS. 3 and 4 are side elevational views of other forms of the invention;

Figure 1:
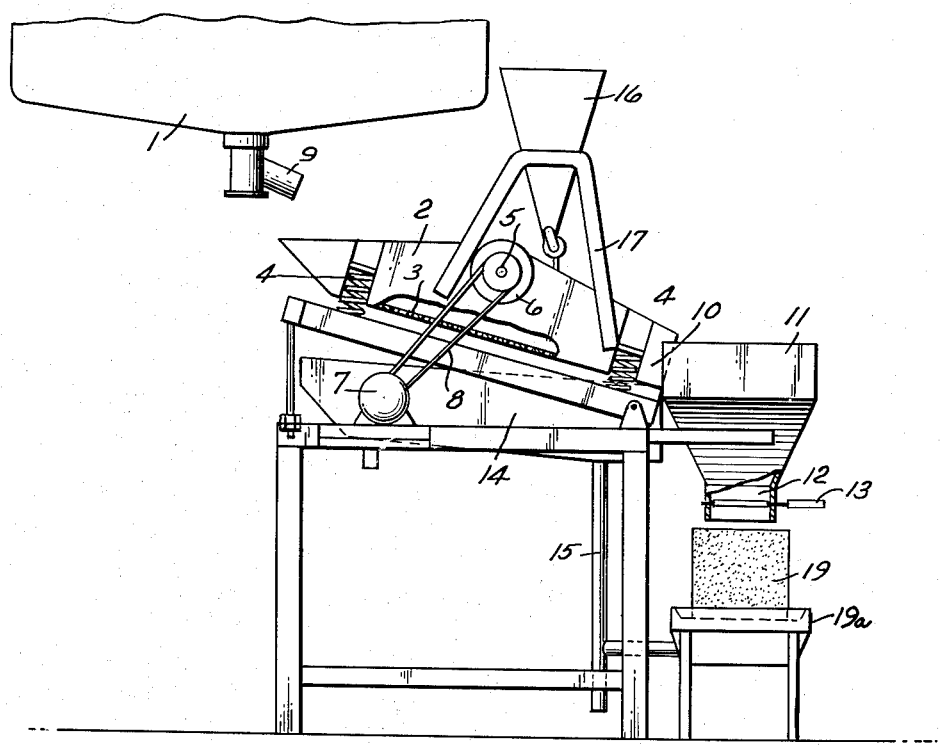
FIG. 1 is a side elevational view of one form of the straining apparatus showing also a tank for the curds and a device for filling the cheese molds.
Figure 2:
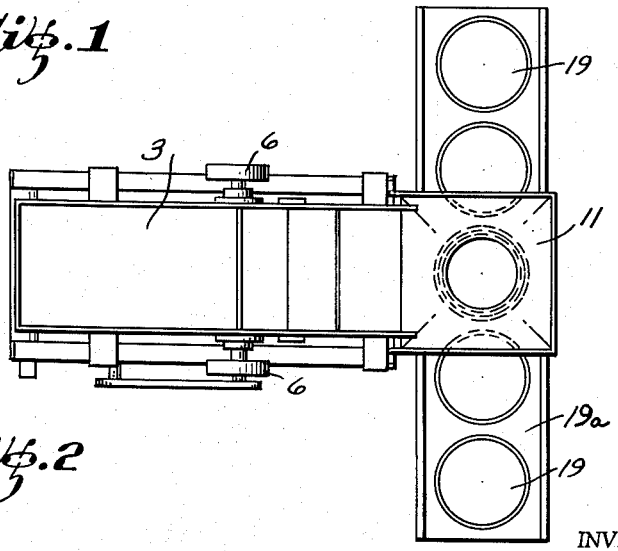
FIG. 2 is a plan view of the straining apparatus of FIG. 1.

Referring to FIGS. 1 and 2, the curds of high whey content flow from a tank 1 to the upper end of inclined vibrating strainer in the form of a trough 2 having a perforated bottom 3. The trough is supported by a number of springs 4 on a frame 4a and is caused to vibrate or shake by weights 6 eccentrically secured on a shaft 5. The weights 6 may be in the form of solid discs having notches (not shown) on one side to give the eccentricity. The shaft 5 is driven from a motor 7 through a belt 8. The curds flow from a pipe fitting 9 at the bottom of the tank 1 down onto the strainer 2 where they spread out so as to form a layer which, by means of the vibrations, is rapidly freed from whey. The vibrations also move the curds downward along the trough-shaped strainer 2 toward its discharge end 10, from which the curds drop down into a funnel 11 having an outlet 12 provided with a valve 13 formed as a damper, or the like. Below the funnel 11 a number of cheese molds 19 are supported for stepwise movement, as by means of a supporting member 19a, and are successively filled with curds by opening and closing the valve 13. The whey leaving through the perforated bottom 3 of the trough is collected in a container 14 which is located on frame 4a below the trough 2 and provided with an outlet 15.

Above the lower part of the trough 2 is a salt container 16 which, as shown in FIG. 1, is rigidly secured to the side walls of the trough 2 by supporting means 17. The supporting means 17 may comprise a bracket welded at its upper portion to each side of salt container 16 and at its lower portion to the underlying side wall of trough 2. Thus, the container 16 will take part in the vibrations of the trough.

The embodiment shown in FIG. 3 differs from that just described in that the funnel 11 is replaced by an extension 18 of the trough 2, the closure means or valve 13a (which in this case may be in the form of a sluice gate) being inserted in the extension 18. In this way the trough 2 is extended as much as is required for collecting the curds to be fed into the molds 19. The valve or sluice gate 13a is closed during the replacement of a filled cheese mold 19 by an empty one.

According to FIG. 4, the trough 2 is supported by resilient uprights 20 (which may be made of spring metal) and is connected to a motor-driven eccentric 21 by means of a rod 22. Accordingly, the trough 2 will be oscillated in a horizontal direction by the vibrating means 21—22. Otherwise, the arrangement is like that shown in FIGS. 1 and 2.

Figure 5:
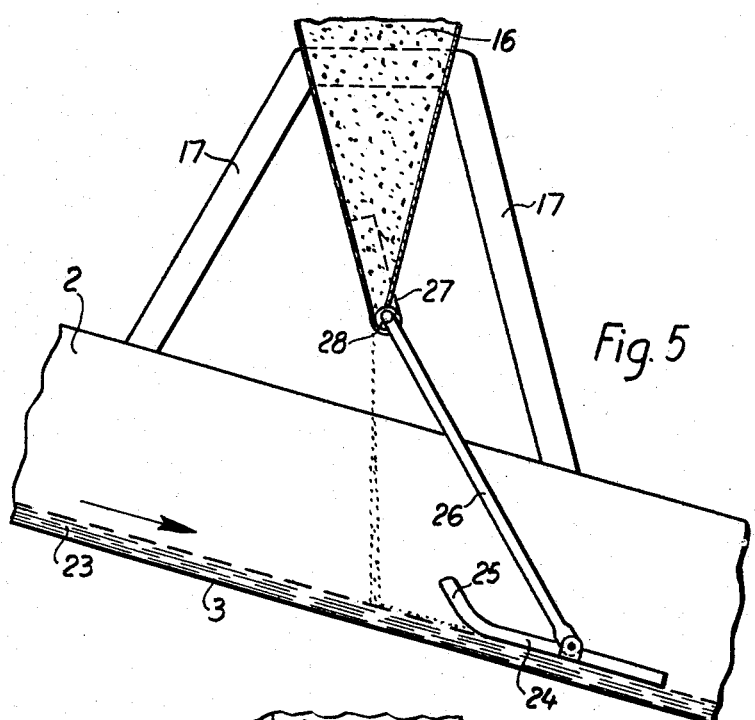
FIGS. 5 and 6 are enlarged side elevational views, partly in section, of different forms of the salting device, showing the regulating means therefor.

In FIG. 5, we have shown part of the trough 2 with its perforated bottom 3 in longitudinal section. On this perforated bottom a layer 23 of curds is carried along and is gradually freed from whey, as previously described, so that when the layer reaches a point directly below the salt container 16, it has attained the state of dryness at which the curds are to be fed into the cheese molds 19. The perforated part of the bottom 3 does not extend downward as far as to the vertical line through the discharge opening of the salt container 16. On the layer 23 of curd particles a drag means 24 slides. The drag 24 may consist of a disc or plate extending over the entire width of the trough 2 and having a bent-up edge 25 facing the upper or inlet end of the trough. The container 16 is in the form of a funnel and has at its bottom 27 a discharge opening the length of which is equal to the width of the layer of curds in the trough. This funnel opening is substantially covered by an eccentric roller 28, the ends of which are suitably mounted for rotation at the sides of the funnel or container 16. The eccentric roller 28 is rigidly connected to the upper end of a rod 26 having its lower end hinged to the drag plate 24. Thus, the roller 28 is adapted to vary the width of the discharge opening at 27 in accordance with variations in the angular position of the connecting rod 26 relative to the bottom of the trough 2, this angular position depending on the thickness of the layer 23. The roller 28 has a cam-shaped cross-section, the profile of which is such as to increase the effective width of the bottom opening at 27 upon counter-clockwise rotation of roller 28 (as viewed in FIG. 5), that is, upon raising of drag plate 24 due to an increase in the thickness of the layer of curd particles 23. Therefore, the salt runs in an even flow down through this bottom opening at 27 and onto the layer of curd particles 23 at a rate which is proportioned to the thickness of this layer.

Figure 6:
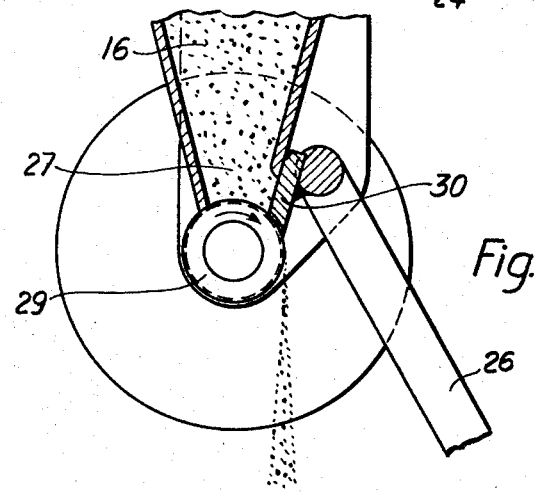

The bottom portion 27 of the container 16, as shown in FIG. 6, is provided with a constantly driven roller 29 engageable with a flap 30 which is swingable with the rod 26 and which forms a variable slot with the periphery of roller 29. The purpose of the rotating roller 29 is to attain a uniform salt discharge independently of the conditions of friction within the salt mass. The rate at which salt discharges through the bottom of container 16 is regulated, of course, by flap 30 which is adapted to be swung about the axis of its rotatable supporting shaft 30a by the rod 26 hinged to the drag plate 24 (FIG. 5). The roller 29 may have peripheral grooves which are axially directed or screw-shaped.

The apparatus of the present invention may also be arranged for continuous preparation of other types of cheese, such as cottage cheese. In this case, the vibrating strainer is provided with means for washing, pre-cooling and final cooling of the curds, passing along the strainer.

Figure 7:
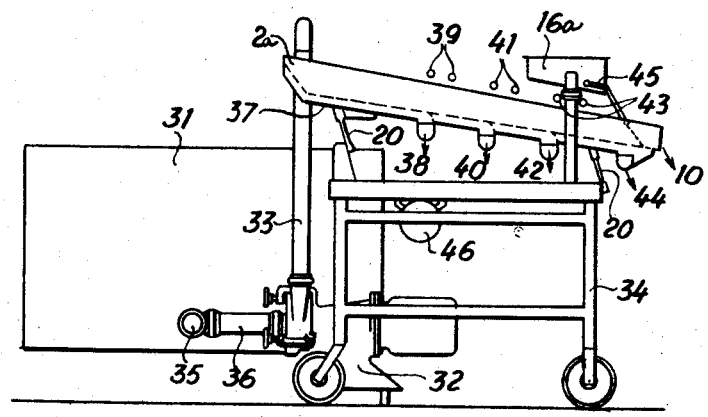
FIGS. 7 and 8 are side elevational and end views, respectively, of another form of the apparatus.
Figure 8:
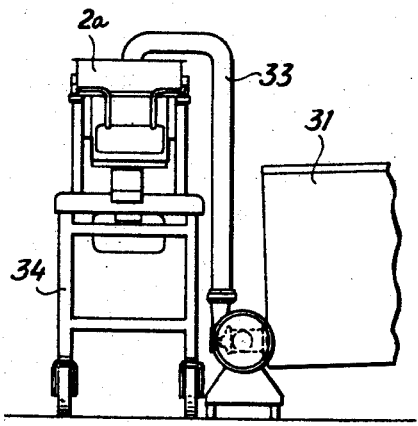

In FIGS. 7 and 8, we have shown the vibrating strainer equipped with means for the preparation of cottage cheese. In the present manufacture of this kind of cheese, the curds are prepared by successive treatments of the milk in a cheese vat, the curds within the vat being freed from whey, which is discharged, and being washed repeatedly with water of suitable temperature. The water is discharged after each washing operation. During the washing, the curds are cooled successively by using cold water. After the washing and cooling, the curds are salted in the vat and are manually scooped from the vat into a packing container by means of straining scoops. If desired, sweet cream, jam, or the like, is added to the curds in the vat.

In the apparatus shown by way of example in FIGS. 7 and 8, the curds of high whey content are fed from a cheese vat 31 by means of a pump 32 through a pipe line 33 to one end of the vibrating strainer 2a. The strainer 2a and the pipe line 33 are arranged so that they can be moved on a portable stand 34 provided with wheels. Thus, when the cheese vat 31 has been emptied, pipe line 33 and strainer 2a can readily be connected to another cheese vat by means of a valve fitting 35 in the feed pipe 36 leading to the pump 32.

The inclined vibrating strainer 2a is divided into four sections which, from left to right in FIG. 7, are for freeing the curds from whey, washing the curds, precooling the curds, and final cooling of the curds, respectively. The whey-containing curds fed on the strainer 2a are freed from the major part of the whey on the first or uppermost section of this strainer. Immediately below the strainer 2a is an inclined collecting trough 37, a whey discharging tube 38 being provided in the lower end of the first section of this collecting trough. At the second section of the strainer 2a there is arranged, above the strainer, one or more spray tubes 39 for feeding water or other flushing liquid for washing the curds to remove whey adhering to the curd particles. This washing liquid is discharged through a second tube 40 in the trough 37. At the third section of the strainer, one or more flushing tubes 41 are arranged above the strainer for precooling the curds by supply of well water, which is discharged from collecting trough 37 through a third tube 42. At the fourth section of the strainer, there is arranged, above the strainer, one or more flushing tubes 43 for supply of ice water for final cooling of the curds, this water being discharged from collecting trough 37 through a fourth tube 44. The curd particles are then discharged from the strainer at its outlet end 10. Before the curds are discharged from the strainer 2a, they are salted from the salt container 16a, which is rigidly secured to the stand 34 of the strainer so as to vibrate therewith. Due to this vibraion, a suitable quantity of salt is fed from container 16a by means of a regulating device 45, which may be arranged as shown in FIG. 5 or FIG. 6. The vibrating motion of the strainer 2a and container 16 is produced by a motor vibrator 46 attached to the stand 34, the strainer being attached to the stand 34 by means of resilient uprights 20, or the like.

It has proved to be of great importance that as much whey as possible be separated from the curd particles during the straining action in the vibrating strainer. If too much whey accompanies the cheese curds as far as to the cheese molds, abnormally large quantities of salt must be added to the curds on the strainer because a large portion of the added salt discharges with the whey during the subsequent pressing of the whey-containing curds in the molds.

Figure 9:
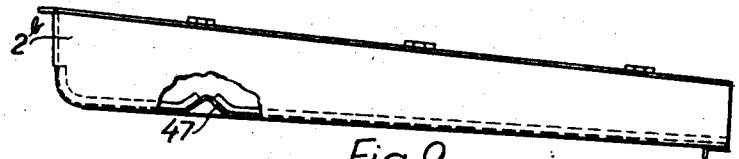
FIG. 9 is a side elevational view of a modification of the vibrating strainer, with a part thereof broken away.

It is possible to reduce the whey content of the curds discharged from the vibrating strainer by elongating the strainer. In most cases, however, this is unsuitable because of the space requirement. Therefore, we prefer to maintain the length of the strainer unchanged but provided with an upwardly directed, transversely extending protuberance 47, as shown in FIG. 9. This protuberance 47 is formed in the bottom part of the strainer 2b which is located nearest the strainer inlet for the whey-containing curds, as shown in FIG. 9. With this arrangement, the discharge of the whey is improved considerably in that the mixture of curds and whey fed onto the strainer 2b is braked by the protuberance 47 when moving along the strainer, so that the main part of the whey has time to be separated before reaching the protuberance, it being easier to separate the whey at the place where the curds have the highest whey content, as is the case at the inlet part of the strainer.

We claim:

1. Apparatus for straining cheese curds, which comprises an inclined vibratory strainer having perforations sufficiently small to allow whey to pass therethrough while retaining the curds, said strainer having a curds and whey inlet at its raised end and a curds outlet at its lower end, a cheese vat, a pipe line leading from the vat to said inlet for delivering curds and whey to said raised end, means operatively connected to the strainer for vibrating the same to convey the curds in a layer from said inlet to said outlet while straining whey from the curds, said inclined vibratory strainer being divided into at least upper and lower sections, the upper of said two sections being operable to separate the major part of the whey from the curds, and means for introducing a washing liquid into the lower of said two sections for flushing the curds received therein from the upper section.

2. Apparatus according to claim 1, in which the inclined vibratory strainer has a third section below said lower section and receiving flushed curds therefrom, the apparatus also comprising means for introducing a cooling liquid into said third section for cooling the flushed curds.

3. Apparatus according to claim 2, in which the inclined vibratory strainer has a lowermost section for receiving curds from said third section, the apparatus also comprising means for introducing a final cooling liquid into the lowermost section.

4. Apparatus according to claim 1, in which said introducing means include a spray tube located above the strainer.

5. Apparatus according to claim 1, comprising also a collecting trough located below the strainer for receiving the whey and washing liquid passing through the strainer.

6. Apparatus according to claim 1, comprising also a collecting trough located below the strainer for receiving the whey and washing liquid passing through the strainer, the collecting trough having collecting tubes for separately discharging the whey and washing liquid, respectively.

7. Apparatus according to claim 1, comprising also an upwardly directed, transversely extending protuberance on the bottom of the strainer, said protuberance being located at the upper portion of the strainer.

References Cited in the file of this patent

UNITED STATES PATENTS

| | | |
|---|---|---|
| 880,359 | Collins | Feb. 25, 1908 |
| 1,475,398 | Kielsmeier | Nov. 27, 1923 |